United States Patent [19]

Nakano

[11] Patent Number: 5,174,153
[45] Date of Patent: Dec. 29, 1992

[54] DEVICE FOR DETECTING THE LEVEL OF A LIQUID IN A RECEPTACLE

[75] Inventor: Yoshimasa Nakano, Tokyo, Japan
[73] Assignee: Kurita Water Industries Ltd., Tokyo, Japan
[21] Appl. No.: 858,680
[22] Filed: Mar. 27, 1992
[51] Int. Cl.[5] ............................................. G01F 23/22
[52] U.S. Cl. ................................. 73/295; 73/304 R; 374/142; 340/622
[58] Field of Search ............... 73/292, 295, 304 R; 340/622; 374/142, 164, 208

[56] References Cited

U.S. PATENT DOCUMENTS

| | | | |
|---|---|---|---|
| 1,833,122 | 11/1931 | Harrison | 73/295 |
| 3,161,050 | 12/1964 | Exner | 73/295 |
| 3,299,706 | 1/1967 | Bailey et al. | 73/304 R |
| 4,112,759 | 9/1978 | Mizuno et al. | 73/295 |
| 4,774,838 | 10/1988 | Rickson | 374/142 |
| 4,796,471 | 1/1989 | Sabin | 73/295 |
| 4,912,977 | 4/1990 | Hope | 73/295 |
| 5,092,170 | 3/1992 | Honstret et al. | 73/295 |

FOREIGN PATENT DOCUMENTS 808290 7/1951 Fed. Rep. of Germany ........ 73/295
57-56716 4/1982 Japan ........................................ 73/295

Primary Examiner—William A. Cuchlinski, Jr.
Assistant Examiner—G. Bradley Bennett
Attorney, Agent, or Firm—Frishauf, Holtz, Goodman & Woodward

[57] ABSTRACT

The detecting device according to the present invention is provided with a case, a first and second detecting pads which juts from the case and which can be closely attached to the outer wall of the receptacle, supports which are connected to the first and second detecting pads in a thermal-conducting manner, a first thermistor and heater embedded in the support of the first detecting pad, a second thermistor embedded in the support of the second detecting pad, and a detector circuit which measures the quantity of heat transmitted from the first detecting pad into the receptacle in accordance with a change in the output of the first thermistor when the first detecting pad and the support thereof are heated by the heater to a preset temperature which is above the reference temperature of the second detecting pad and the support thereof, thus detecting the level of a liquid in the receptacle from the measured quantity of heat transmitted.

9 Claims, 10 Drawing Sheets

DEVICE FOR DETECTING THE LEVEL OF A LIQUID IN A RECEPTACLE

BACKGROUND OF THE INVENTION

1. Field of the Invention

The present invention relates to a device for detecting the level of a liquid filled in an opaque receptacle such as a metallic receptacle without any contact with the liquid.

2. Description of the Related Prior Art

A liquid such as refreshing drink syrup and beer is filled in a hermetically sealed receptacle such as a tank and container. A desired amount of the liquid in the receptacle is taken out and consumed through a tap of the receptacle.

This type of hermetically sealed receptacle is normally made of a metal to prevent the quality of the liquid in it from deteriorating, and therefore, the liquid in the receptacle cannot be seen from outside. For this reason, a manager of the receptacle has to guess the remaining volume of the liquid inside by using his head, or infer the remaining volume from the weight of the receptacle by placing it on a balance.

However, the above-mentioned manner for detecting the remaining volume is extremely unreliable and is cumbersome for the manager, and the manager is apt to neglect checking the remaining amount in the receptacle. As a result, it is not until the liquid in the receptacle runs out that the manager comes to know that there is no liquid left, that is, the receptacle is empty.

As a solution to such a problem, it is considered to use a hermetically sealed receptacle incorporating a device for detecting the liquid level. However, this is not feasible because it would be necessary to replace all existing receptacles with those provided with such detecting devices. Additionally, some types of detecting devices have sensor units that are designed to directly contact a liquid in a receptacle. Such detecting devices cannot be used when the liquid is food.

SUMMARY OF THE INVENTION

An object of the present invention is to provide a device which makes it possible to detect the level of a liquid filled in an opaque receptacle from outside thereof without touching the liquid.

The above-mentioned object is achieved by a detecting device according to the present invention, which detecting device comprises a first heat conduction member to be in contact with an outer wall of a receptacle, a second heat conduction member to be in contact with the outer wall of the receptacle on condition that the second heat conduction member is apart from the first heat conduction member in a horizontal direction, a first temperature sensor for detecting temperature changes in the first heat conduction member, a second temperature sensor for detecting a temperature of the second heat conduction member, heating means for electrically heating the first heat conduction member to a predetermined temperature which is higher than that of the second heat conduction member when the first and second heat conduction members are in contact with the outer wall of the receptacle, and controlling means for controlling the heating of the first heat conduction member by means of the heating means in accordance with an output change of the first temperature sensor, which output change represents an amount of transmitted heat that is released from the first heat conduction member into the receptacle through the outer wall thereof, the amount of transmitted heat corresponding to the liquid level in the receptacle.

According to the detecting device mentioned above, when the first heat conduction member is heated to the predetermined temperature, the heat of the first heat conduction member is transmitted into the receptacle through the outer wall thereof. The amount of transmitted heat from the first heat conduction member into the receptacle changes in accordance with the level of the liquid in the receptacle. More specifically, the heat transfer rate of the liquid is larger than that of air, an amount of heat transmitted is accordingly larger when the liquid level is higher than the mounting height of the first heat conduction member, while an amount of heat transmitted is smaller when the liquid level is lower than the mounting height of the first heat conduction member because the heat transfer rate of air is smaller than that of the liquid. Hence, if the amount of transmitted heat from the first heat conduction member is detected as an output change of the first temperature sensor, then the level of the liquid in the receptacle can be detected from the output change.

As a specific example, by detecting a quantity of electricity which is supplied to the heating means to maintain the temperature of the first heat conduction member at the predetermined temperature in accordance with the output change of the first temperature sensor, the amount of transmitted heat from the first heat conduction member i.e., the liquid level, can be detected from the amount of electricity supplied.

As another example, by measuring a cooling time, that is, the time required for the first heat conduction member to lower to the temperature of the second heat conduction member from the predetermined temperature in accordance with an output of the first temperature sensor, the amount of heat transmitted from the first heat conduction member, i.e., the liquid level, can be detected from the cooling time.

The first and second heat conduction members are in contact only with the outer wall of the receptacle, and therefore, the detecting device according to the present invention makes it possible to detect the liquid level without contacting the liquid in the receptacle.

Preferably, the detecting device is equipped with a case with the first and second heat conduction members, and the case is designed to be fixed onto the outer wall of the receptacle with a belt or a mounting arm so that it is removable.

Further, if the first and second temperature sensors are embedded in the first and second heat conduction members, respectively, the temperature sensors are capable of accurately detecting temperature changes in the heat conduction members.

BRIEF DESCRIPTION OF THE DRAWINGS

FIG. 1 is a perspective view of a receptacle with a detecting device mounted on;

DETAILED DESCRIPTION OF PREFERRED EMBODIMENTS

Figure 1:
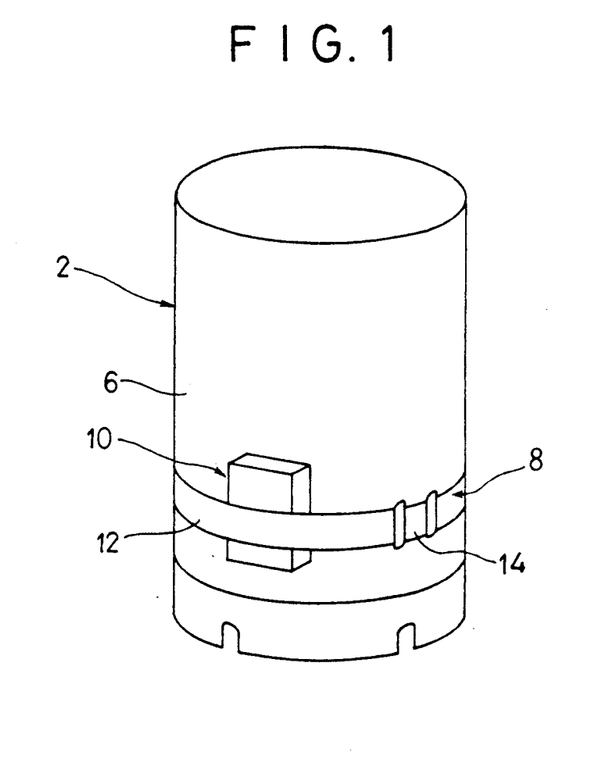

Referring to FIG. 1, a metallic receptacle 2 which has thermal conductance is shown. The receptacle 2 is cylindrical, and it is designed so that a liquid such as beer can be filled in it. The beer inside the receptacle 2 can be taken out through the tap (not shown).

A detecting device 10 is mounted on the lower part of the outer wall 6 of receptacle 2 by means of a belt 8. The belt 8 comprises an elastic rubber band 12 and a buckle 14 which is fixed at one end of the band 12. Thus, the detecting device 10 is pressed against the outer wall 6 of the receptacle 2 with the belt 8 in a manner that it can be removed.

Figure 2:
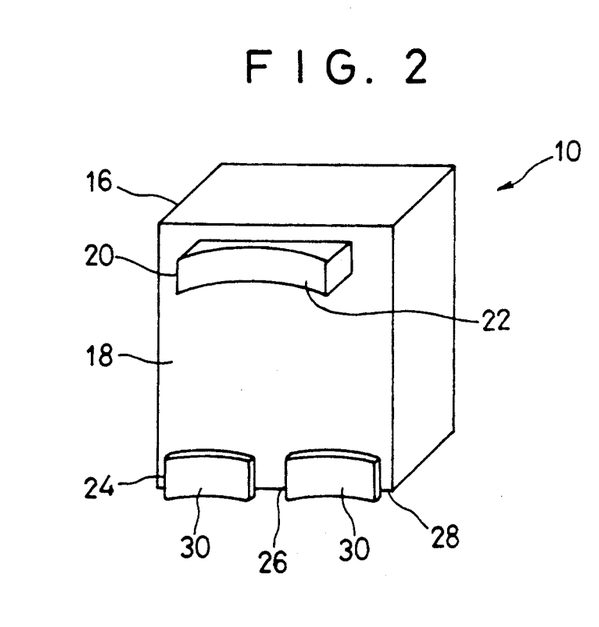
FIG. 2 is a perspective view of the detecting device of FIG. 1.

The detecting device 10, as shown in FIG. 2 is equipped with a rectangular case 16 which is made of a synthetic resin. A support pad 20 is mounted on the upper part of a back surface 18 of the case 16. The support pad 20 has a pad surface 22 which has a radius of curvature which is identical to that of the outer wall 6 of the receptacle 2.

On the bottom part of the back surface 18 of the case 16 are provided first and second detecting pads 24 and 26 which are made of thermal-conducting rubber. The first and second detecting pads 24 and 26 are positioned at the same level from the bottom surface 28 of the case 16, and are set slightly apart from each other in a horizontal direction, as shown in FIG. 2. The first and second detecting pads 24 and 26 also have pad surfaces 30 which are identical to the pad surface 22 of the support pad 20, and these pad surfaces 30 are curved along the outer wall 6 of the receptacle 2, and the pad surface 22 and the pad surfaces 30 are positioned with the same distance away from the back surface 18 of the case 16.

Thus, the support pad 20 and the first and second detecting pads 24 and 26 of the case 16 can be brought in close contact with the outer wall 6 of the receptacle 2.

Figure 3:
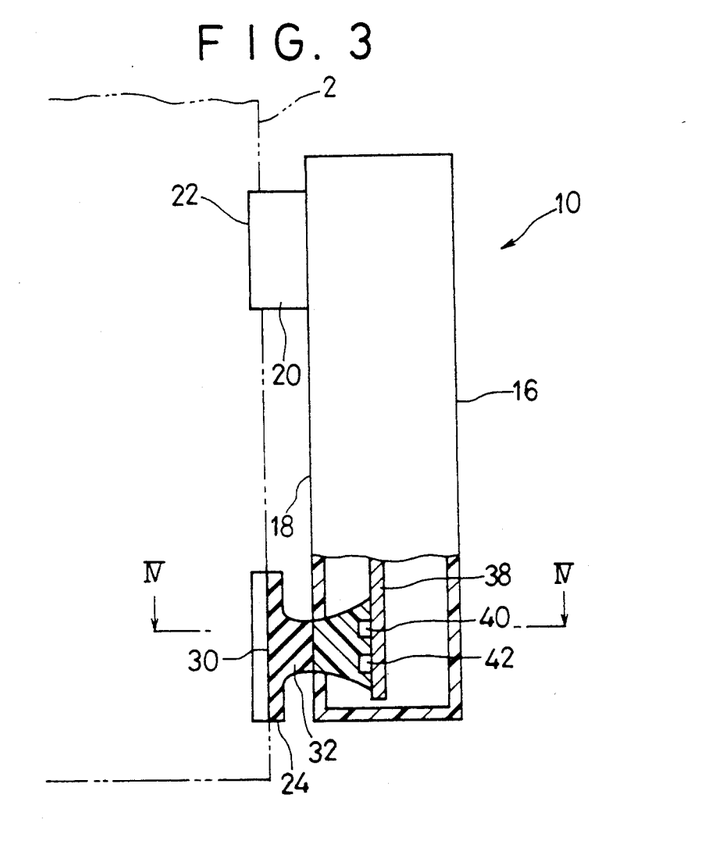
FIG. 3 is a side view of the detecting device of FIG. 1, parts being broken away for clearness.
Figure 4:
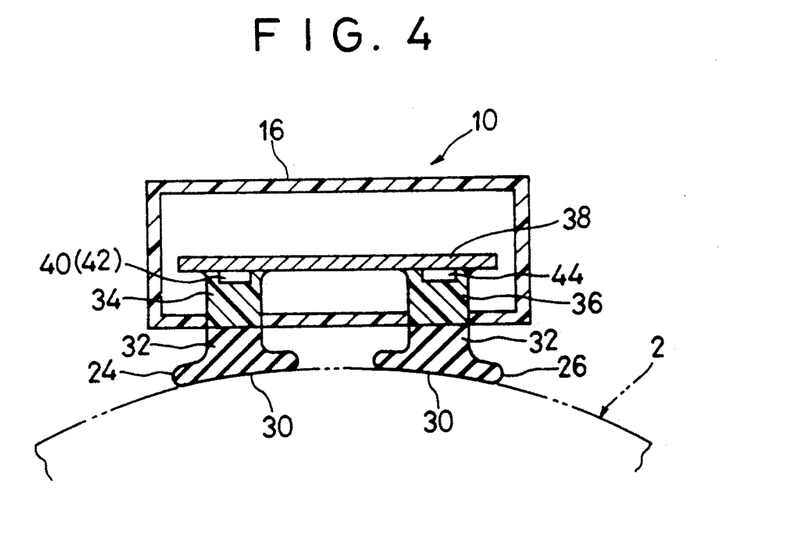
FIG. 4 is a section taken along the line IV—IV of FIG. 3.

As is obvious from FIG. 3 and FIG. 4, the portions of each of the detecting pads 24 and 26 on the side of the back surface 18 of the case 16 are formed as shanks 32 which are individually adhered to one ends of supports 34 and 36, respectively, one ends of supports 34 are exposed from the back surface 18 of the case 16. These supports 34 and 36 are made of a thermal-conducting silicone resin. The other ends of supports 34 and 36 are adhered to a printed plate board 38 incorporated in the case 16. The supports 34 and 36 are also positioned apart on the printed plate board 38. The first and second detecting pads and the supports may be formed into one piece.

The thermal capacity of a first heat conduction member including the first detecting pad 24 and the support 34 and the thermal capacity of a second heat conduction member including the second detecting pad 26 and the support 36 are set to the same value.

As shown in FIG. 3, a heater 40 and a first thermistor 42 are mounted on the printed plate board 38 with a specified distance provided between them, and these heater 40 and thermistor 42 are embedded in the support 34 of the first heat conduction member.

Further, on the printed plate board 38 is mounted a second thermistor 44 which is different from the first thermistor 42 as shown in FIG. 4, and the second thermistor 44 is embedded in the support 36 of the second heat conduction member.

It should be noted that the first and second thermistors 42 and 44 have a characteristic in which their resistance decreases as the temperature rises.

Figure 5:
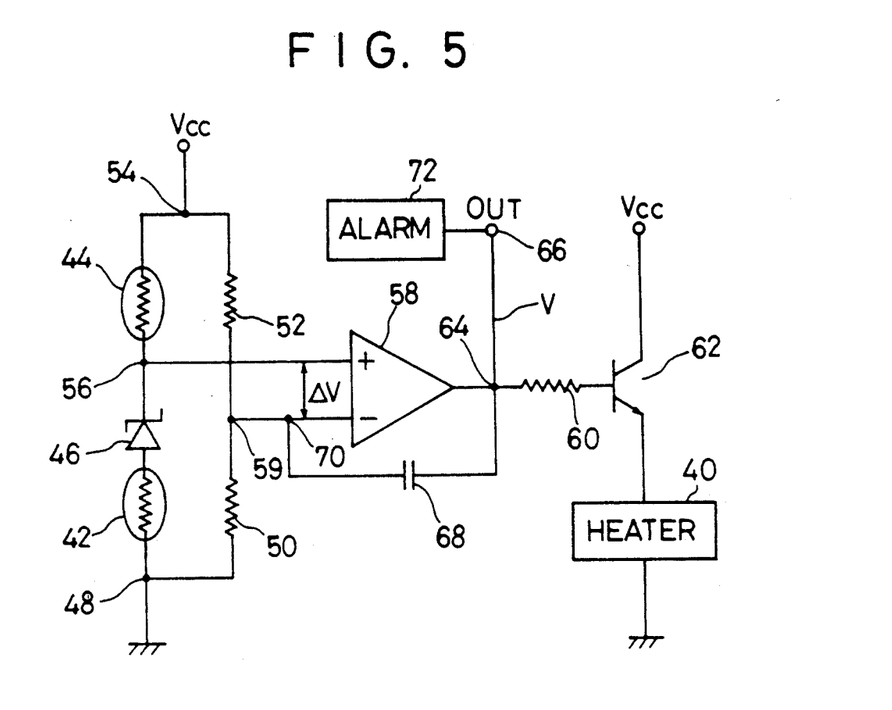
FIG. 5 is a diagram illustrating a detector circuit of an embodiment built in the detecting device.

The heater 40 and the first and second thermistors 42 and 44 are connected in a detector circuit on the printed plate board 38, the detector circuit being illustrated in FIG. 5.

In the detector circuit, one ends of the first and second thermistors 42 and 44 are connected in series via a Zener diode 46, and the other end of the first thermistor 42 is grounded. A node 48 between the other end of the first thermistor 42 and the ground is connected in series with the other end of the second thermistor 44 via resistors 50 and 52.

A node 56 between the second thermistor 44 and the Zener diode 46 is connected to one of the input terminals of a differential amplifier 58, and a node 59 between the resistors 50 and 52 is connected to the other of the input terminals of the differential amplifier 58. The output terminal of the differential amplifier circuit 58 is connected to the base of a power transistor 62 via a resistor 60. The collector of the power transistor 62 is connected to a power supply Vcc, and the emitter thereof is grounded via the heater 40.

Thus, the differential amplifier 58 is connected to a bridge circuit which includes the first and second thermistors 42 and 44, and the resistors 50 and 52. The bridge circuit is connected to the power supply Vcc via a node 54 between the resistor 52 and the second thermistor 44. Assuming that the resistance of the first thermistors 42 is the same as that of the second thermistor 44, the power suppy Vcc is to apply Zener voltage across the Zener diode 46.

A node 64 between the differential amplifier 58 and the resistor 60 is, on the one hand, connected to an output terminal 66 of the detector circuit, and is connected to a node 70 between the differential amplifier 58 and the node 59 via a capacitor 68, on the other hand. To the output terminal 66 is connected an alarm 72. The alarm 72 includes a battery, and it operates in accordance with voltage supplied through the output terminal 66.

The operation of the above-mentioned detecting device will now be described.

The detecting device 10 is mounted on the lower part of the receptacle 2 by means of the belt 8 as shown in FIG. 1, and the support pad 20 and the first and second detecting pads 24 and 26 of the detecting device 10 are in close contact with the outer wall 6 of the receptacle 2. The receptacle 2 is fully filled with beer, i.e., a liquid, and therefore, the liquid level is well above the first and second detecting pads 24 and 26 of the detecting device 10.

Under such conditions, when the power supply Vcc of the detecting device 10 is switched to ON, the detector circuit is actuated.

When the detector circuit is actuated, the outer wall 6 of the receptable 2 has room temperature, i.e., a constant reference temperature Ts. The heat of the outer wall 6 of the receptacle 2 is transmitted to the second thermistor 44 via the second detecting pad 26 and the support 36; therefore, the resistance of the second thermistor 44 is maintained at the reference resistance value which corresponds to the reference temperature Ts.

Immediately after the detector circuit is activated, the heat of the outer wall 6 of the receptacle 2 is also transmitted to the first thermistor 42 via the first detecting pad 24 and the support 34; therefore, the first thermistor 42 provides the same resistance value as the reference resistance value of the second thermistor 44.

Accordingly, when the resistance values of the first and second thermistors 42 and 44 are equal, the Zener voltage is applied across the Zener diode 46 as mentioned above, and therefore, a voltage difference $\Delta V$ which relates to the Zener voltage is applied between the node 56 and the node 59, that is, between the input terminals of the differential amplifier 58. The voltage difference $\Delta V$ is amplified through the differential amplifier 58 and applied to the base of the power transistor 62. As a result, a maximum current is produced between the collector and emitter of the power transistor 62, and the maximum current causes the heater 40 to generate heat.

Figure 7:
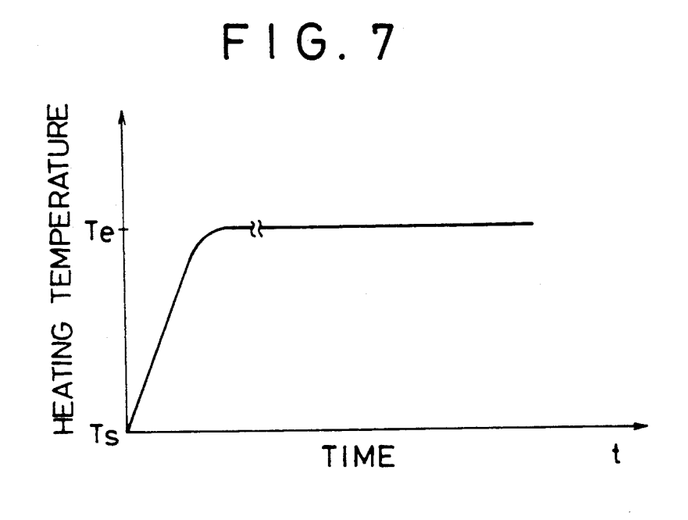
FIG. 7 is a graph illustrating temperature changes in the first detecting pad caused by heating.

The heater 40 heats the support 34 and the first detecting pad 24 to raise their temperatures as shown in FIG. 7. Meanwhile, since the first detecting pad 24 is in close contact with the outer wall 6 of the receptable 2, the heat of the first detecting pad 24 and the support 34 is transmitted from the first detecting pad 24 into the liquid in the receptacle 2 through the outer wall 6 thereof. However, the temperature of the first detecting pad 24 and the support 34 gradually rise from the reference temperature Ts by heating, in spite of the heat transmission from the first detecting pad 24 into the receptacle 2, and the rise in temperature cause the resistance of the first thermistor 42 to decrease.

When the resistance of the first thermistor 42 decreases, the inverse voltage applied across the Zener diode 46 decreases in the detector circuit of FIG. 5. This causes a drop in the input voltage applied between the input terminals of the differential amplifier 58, i.e., the output voltage of the differential amplifier 58. As a result, the quantity of electricity or the electric current supplied to the heater 40 also decreases, controlling the heat generated by the heater 40. After that, when the temperature of the first detecting pad 24 and the support 34 lowers because of the transmission of heat from the first detecting pad 24 and support 34 into the liquid in the metallic receptacle 2 through the outer wall 6, the resistance of the first thermistor 42 increases and then the output voltage of the differential amplifier 58 rises. As a result, the amount of heat generated by the heater 40 is accordingly increased.

In other words, the first detecting pad 24 and the support 34 are maintained at a preset temperature Te which is, for example, 10° C. higher than the reference temperature Ts detected by the second thermistor 44 by receiving heat from the heater 40 and also by transmission the heat into the receptacle 2. In this way, the differential amplifier 58 maintains an output voltage V required for maintaining the preset temperature Te.

The output voltage V of the differential amplifier 58 depends on the amount of heat transmitted from the detecting pad 24 and the support 34 into receptacle 2, and therefore, the output voltage V is maintained at a constant level as long as a level SL of the liquid in the receptacle 2 stays above the mounting height of the detecting device 10.

Figure 6:
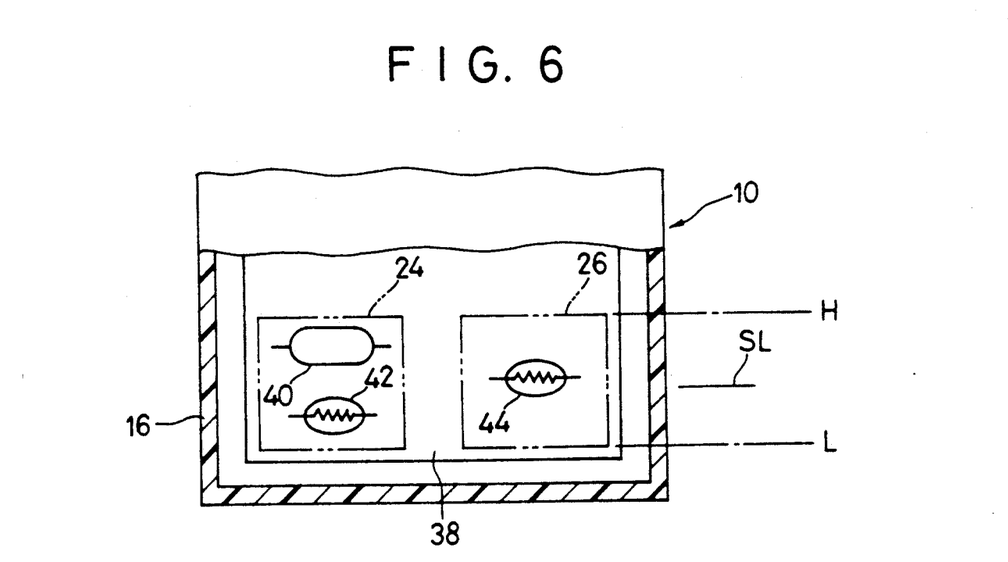
FIG. 6 is a diagram illustrating relative levels of first and second detecting pads and a liquid level.

When the remaining volume of the liquid in the receptacle 2 decreases, and the level SL of the liquid lowers below a height H of the top edge of the first detecting pad 24 as shown in FIG. 6, the amount of heat transmitted from the first detecting pad 24 into the liquid through the outer wall 6 of the receptacle 2 decreases. Hence, a smaller amount of heat generated by the heater 40 is required to keep the temperatures of the first detecting pad 24 and the support 34 at the preset temperature Te; therefore, the output voltage V of the differential amplifier 58 decreases accordingly.

As the level SL of the liquid in the receptacle 2 further lowers, the output voltage V of the differential amplifier 58 also gradually drops. When the liquid level SL further lowers until it reaches below a level L of the bottom edge of the first detecting pad 24, the first detecting pad 24 no longer contacts the liquid in the receptacle 2 through the outer wall 6 of the receptacle 2.

Under such condition, the heat from the first detecting pad 24 is transmitted only into the air in the receptacle 2 through the outer wall 6 of the receptacle 2, and therefore, the amount of the heat transmitted further decreases until it reaches a constant level of amount. Hence, the output voltage V of the differential amplifier 58 is also decreased and eventually maintained at a minimum value.

Figure 8:
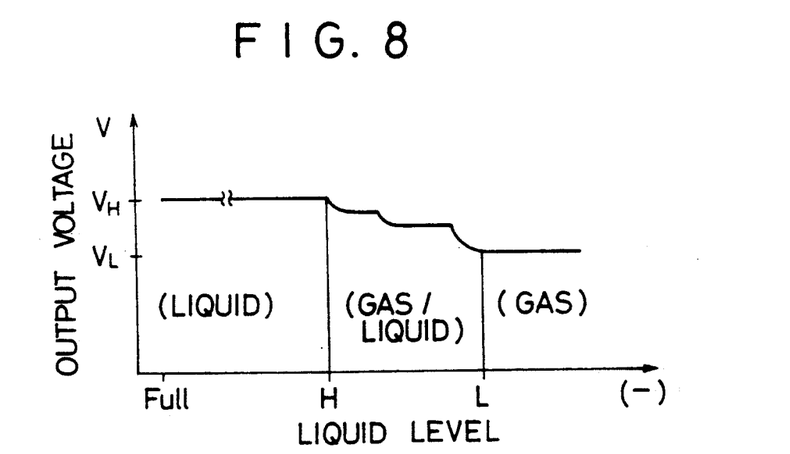
FIG. 8 is a graph illustrating the relationship between the liquid level and an output voltage of the detector circuit of FIG. 5.

Thus, when the level SL of the liquid in the receptacle 2 lowers from a maximum level down below the height H of the top edge of the first detecting pad 24, the output voltage V of the differential amplifier 58 gradually drops from a maximum value VH as shown in FIG. 8. Further, when the liquid level SL lowers below the level L of the bottom edge of the first detecting pad 24, the output voltage V of the differential amplifier 58 reaches the minimum value VL. FIG. 8 shows changes in the output voltage V of the differential amplifier 58 when the remaining volume of the liquid in the receptacle 2 is gradually decreased.

Hence, the level of the liquid in the receptacle 2 can be detected by taking out the output voltage V of the differential amplifier 58 through the output terminal 66 of the detector circuit. More specifically, the above-mentioned alarm 72 is actuated, and a warning is issued by the alarm 72 when the output voltage V obtained through the output terminal 66 of the detector circuit reaches a specified value between the maximum value VH and the minimum value VL.

As a result, the manager of the receptacle 2 can know from the warning given by the alarm 72 that the remaining volume of the liquid in the receptacle 2 has lowered below a permissible level. After that, the detecting device 10 is removed from the receptacle 2, and attached using the belt 8 to a new receptacle fully filled with the liquid.

Figure 9:
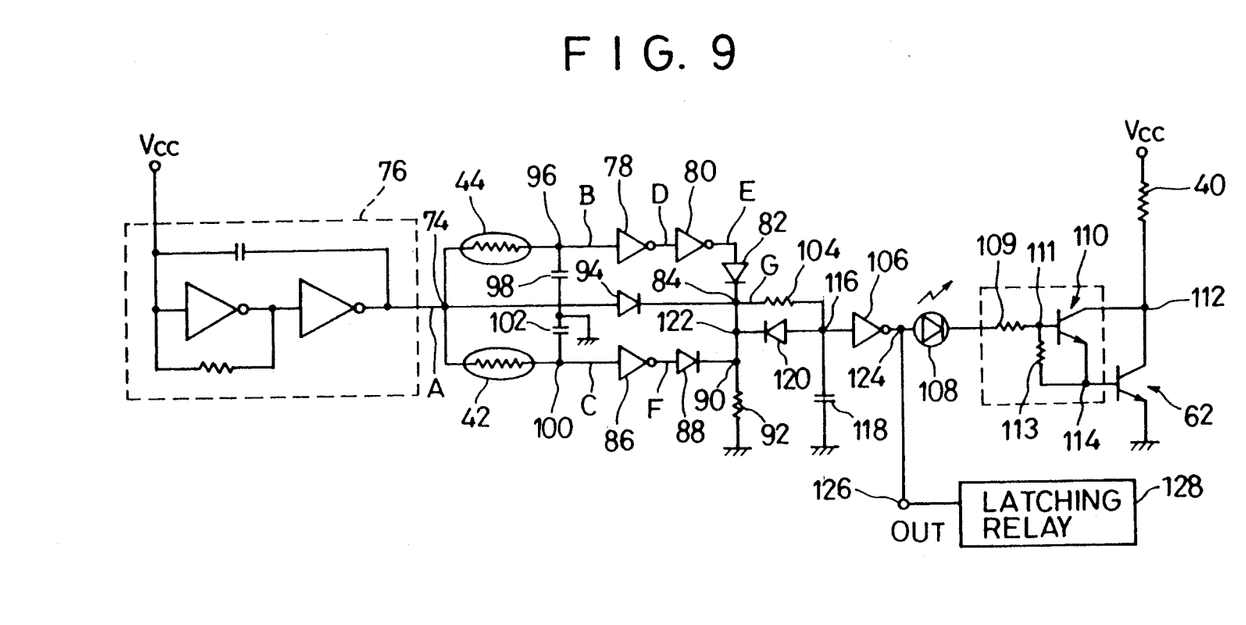
FIG. 9 is a diagram illustrating a detector circuit of a modification.

Referring to FIG. 9, an example of modification of the detector circuit is shown. In the example of modification, the first and second thermistors 42 and 44 are connected to a pulse generator circuit 76 through a node 74 at one end. The pulse generator circuit 76 includes an astable multivibrator as illustrated, and it issues pulse signals with amplitude values of O or more.

The other end of the second thermistor 44 is connected to a node 84 via amplifies 78 and 80, and a rectifying diode 82. The other end of the first thermistor 42 is connected to a node 90 via an amplifier 86 and a rectifying diode 88. The node 90 is connected to the node 84 on the one hand, and it is grounded via a resistor 92 on the other hand.

The node 84 is interconnected with the node 74 on the side of the pulse generator circuit 76, and a rectifying diode 94 is inserted between the nodes 74 and 84.

A node 96 between the second thermistor 44 and the amplifier 78 is grounded via a capacitor 98, and a node 100 between the first thermistor 42 and the amplifier 86 is also grounded via a capacitor 102. The capacitor 102 has a larger capacitance than the capacitor 98.

The node 84 is connected to a resistor 104, an amplifier 106, and a photo diode 108 in the order they are listed, the photo diode 108 being connected to the base of a switching transistor 110 via a resistor 109. A node 111 between the base of the transistor 110 and the resistor 109 is connected to the base of the power transistor 62 via a resistor 113. The photo diode 108 is attached to the outer surface of the case 16 of the detecting device 10.

The collector of the transistor 110 is connected to the power supply Vcc via the heater 40, and the emitter is connected to a node 114 between the base of the power transistor 62 and the resistor 113. Further, the collector of the power transistor 62 is connected to the heater 40 via a node 112, the emitter thereof being grounded.

A node 116 between the resistor 104 and the amplifier 106 is grounded via a capacitor 118. The node 116 is also connected to a node 122 between the nodes 84 and 90 via a rectifying diode 120.

Further, a node 124 between the amplifier 106 and the photo diode 108 is connected to an output terminal 126. To this output terminal 126 is connected a latching relay 128 in this embodiment.

According to the detector circuit of the example of modification described above, pulse signals supplied from the pulse generator circuit 76 to the node 74 are transmitted via a path which runs from the node 74 to the node 84 through the first thermistor 42, a path which runs from the node 74 to the node 84 through the diode 94, and a path which runs from the node 74 to the node 84 through the second thermistor 44, then they merge at the node 84.

It is assumed that the receptacle 2 is fully filled with a liquid, the receptacle 2 is provided with the detecting device 10, and the detecting device 10 has just been actuated.

In this case, the first and second thermistors 42 and 44 detect the same reference temperature Ts as previously discussed, and therefore, these thermistors 42 and 44 have the same resistance value. Under such a condition, the pulse waveforms shown in FIG. 10 appear at points A through G in the detector circuit of FIG. 9.

More specifically, the pulse waveform supplied directly from the pulse generator circuit 76 to the node 84 appears at point A in the detector circuit, and the pulse waveform supplied through the thermistors 44 and 42 from the pulse generator circuit 76 appears at points B and C. Regarding the capacitors 102 and 98 connected to the first and second thermistors 42 and 44, respectively, as previously described, the capacitance of the capacitor 102 is larger than that of the capacitor 98. For this reason, the rise of the pulse waveform at point C delays compared with that at point B. To be more specific, the time required for the pulse waveform at point C to rise and fall to the half amplitude is delayed by a time t0 and a time t1, respectively, compared with the pulse waveform at point B.

Figure 10:
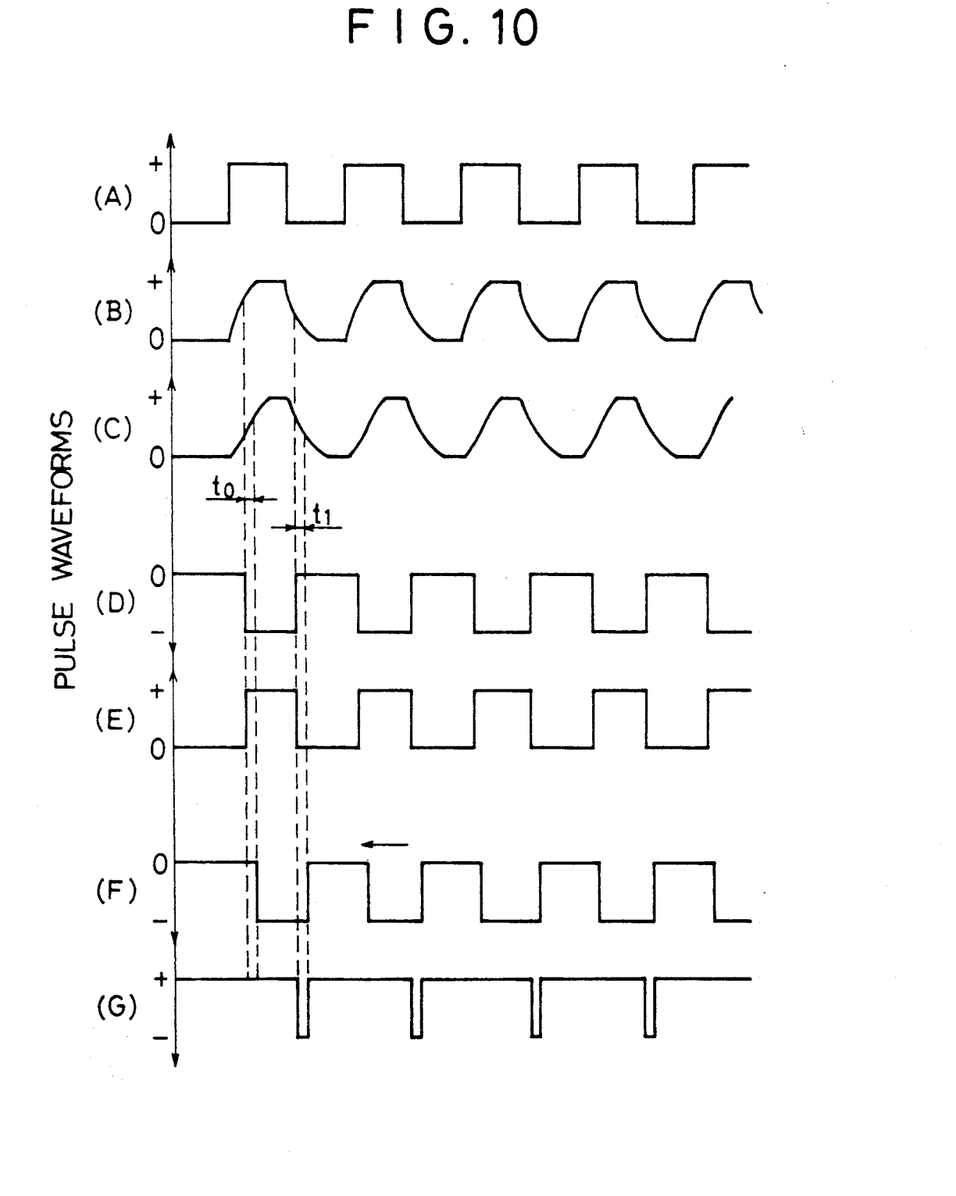
FIG. 10 is a diagram showing pulse waveforms at individual points in the detector circuit of FIG. 9 when the temperatures of the first and second detecting pads are within a predetermined temperature range.

Consequently, when the pulse waveform at point B passes successively through the amplifiers 78 and 80, the pulse waveforms shown under (D) and (E) of FIG. 10 appear at points D and E in the detector circuit. On the other hand, when the pulse waveform at point C passes through the amplifier 86, the pulse waveform shown under (F) of FIG. 10 which is delayed in rise and fall by t0 and t1, respectively, and reversed in relation to the pulse waveform at point E, appears at point F in the detector circuit.

Thus, when the pulse waveforms at points A, E, and F are combined at the node 84, the pulse waveform shown under (G) of FIG. 10 appears at point G in the detector circuit. In other words, as is obvious from (G) of FIG. 10, a periodical pulse waveform generated due to the time difference t1 in rise and fall between the pulse waveforms (E) and (F) appears at point G in the detector circuit. In this case, for the pulse waveform at point G, a positive sign (+) is used to indicate amplitude values of 0 or more, while a negative sign (−) is used to indicate negative amplitude values.

The pulse waveform emerging at point G in the detector circuit is amplified by the amplifier 106, then supplied to the switching transistor 110 via the photo diode 108. Therefore, in this case, the moment the photo diode 108 turns ON, the switching transistor 110 turns ON, causing the power transistor 62 to turn ON also.

Under such condition, the heater 40 is energized to generate heat. This starts heating the first detecting pad 24 and the support 34 of the detecting device 10 as previously discussed.

Figure 11:
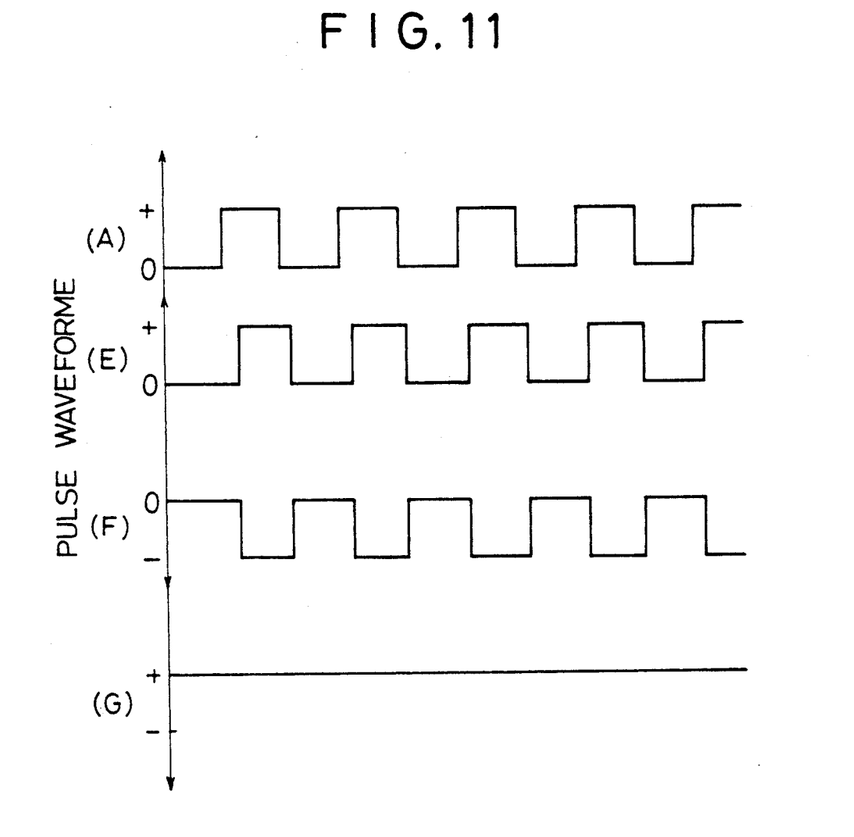
FIG. 11 is a diagram showing pulse waveforms at the individual points in the detector circuit of FIG. 9 when the first detecting pad is heated to a predetermined temperature.

As the temperatures of the first detecting pad 24 and the support 34 rise, the resistance of the first thermistor 42 gradually decreases; therefore, the phase of the pulse waveform at point F in the detector circuit is advanced as shown by the arrow in FIG. 10. Thus, when the temperatures of the first detecting pad 24 and the support 34 rise to the preset temperature Te, causing the phase of the pulse waveform at point F to be advanced sufficiently to offset the time difference t1, the pulse waveform at point G in the detector circuit disappears as shown in FIG. 11. As a result, both switching transistor 110 and power transistor 62 are turned OFF, causing the heater 40 to be de-energized, and therefore stopping the heating of the first detecting pad 24 and the support 34 by the heater 40. At this point, the photo diode 108 is turned OFF. Hence, the manager of the receptacle 2 can visually know whether the heater 40 is in an energized or de-energized state by checking whether the photo diode 108 is ON or OFF.

It should be noted that an ON signal appears at the output terminal 126 of the detector circuit when the heater 40 is energized, while an OFF signal appears at the output terminal 126 when the heater 40 is de-energized. These ON and OFF signals are held at the latching relay 128. This makes it possible to detect by the latching relay 128, even if the power is turned OFF, the condition of a signal that was on the output terminal 126 when the power was turned OFF.

When the heat generation by the heater 40 is stopped, the heat of the first detecting pad 24 and the support 34 is simply transmitted into the liquid in the receptacle 2 through the outer wall 6 of the receptacle 2, and therefore the temperatures of the first detecting pad 24 and the support 34 gradually lower from the preset temperature Te. After that, the resistance value of the first thermistor 42 increases, and the phase of the pulse waveform at point F in the detector circuit is delayed, causing a negative pulse waveform to appear at point G again. This restarts the energizing of the heater 40, and the first detecting pad 24 and the support 34 are heated to the preset temperature Te.

Figure 12:
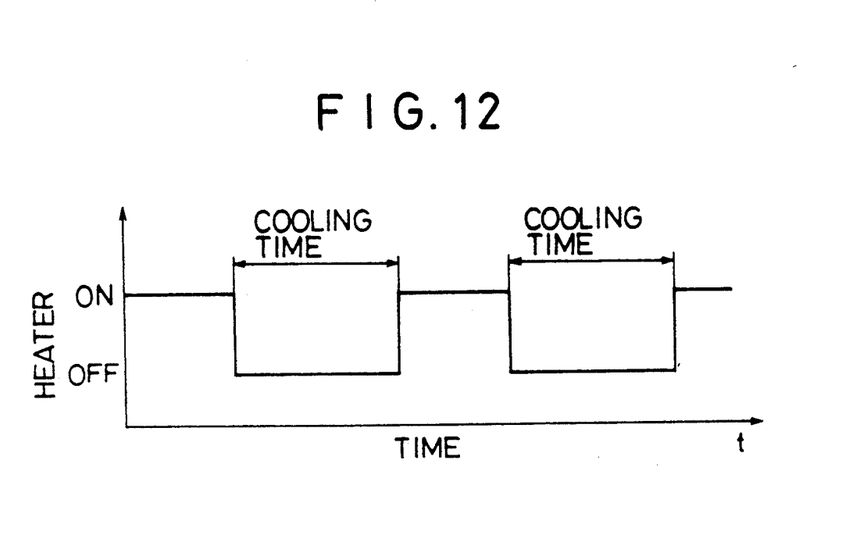
FIG. 12 is a time chart showing the ON/OFF operations of a heater.

Thus, the heater 40 is energized and de-energized repeatedly as shown in FIG. 12. The time during which energizing of the heater 40 is stopped is the cooling time for the first detecting pad 24 and the support 34.

Figure 13:
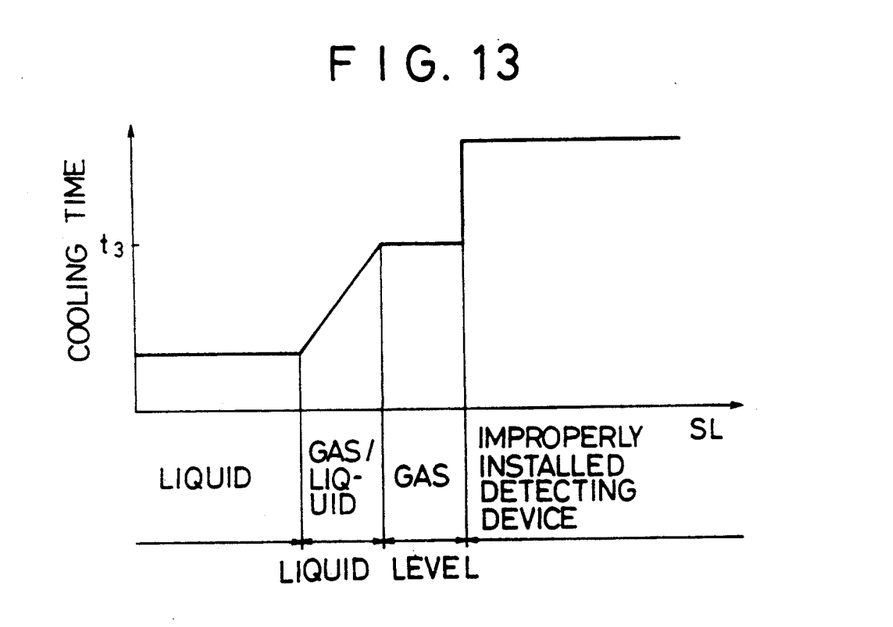
FIG. 13 is a diagram illustrating the relationship between the liquid level in the receptacle and the cooling time of the detecting pads.

The cooling time varies with the level SL of the liquid in the receptacle 2. More specifically, when the liquid level SL is above the level H of the top edge of the first detecting pad 24 (see FIG. 6), heat from the first detecting pad 24 is transmitted through the liquid in the receptacle 2, and therefore, the maximum amount of heat is transmitted with a consequent shortest cooling time. As the liquid level SL lowers below the level H, the heat from the first detecting pad 24 is transmitted into both liquid and gas in the receptacle 2, and the cooling time is gradually extended. When the liquid level SL further lowers below the level L of the bottom edge of the first detecting pad 24, the heat from the first detecting pad 24 is transmitted only into the gas in the receptacle 2, and the cooling time is further extended. Thus, the cooling time changes with the level SL of the liquid in the receptacle 2 as illustrated in FIG. 13.

If the detecting device 10 is incompletely attached to the outer wall 6 of the receptacle 2; in other words, if the first detecting pad 24 is not in close contact with the outer wall 6, then the heat is scarcely transferred from the first detecting pad 24 to the outer wall 6, and therefore, the foregoing cooling time will be even longer than the cooling time required when the receptacle 2 is empty.

Hence, measuring the cooling time, that is, the time required for maintaining the OFF signal of the heater 40 appearing at the output terminal 126 of the detector circuit, makes it possible to detect the level SL of the liquid in the receptacle 2. Further, it is also possible to judge that the detecting device 10 has not been properly installed when the cooling time exceeds a specified time t3 as shown in FIG. 13.

Figure 14:
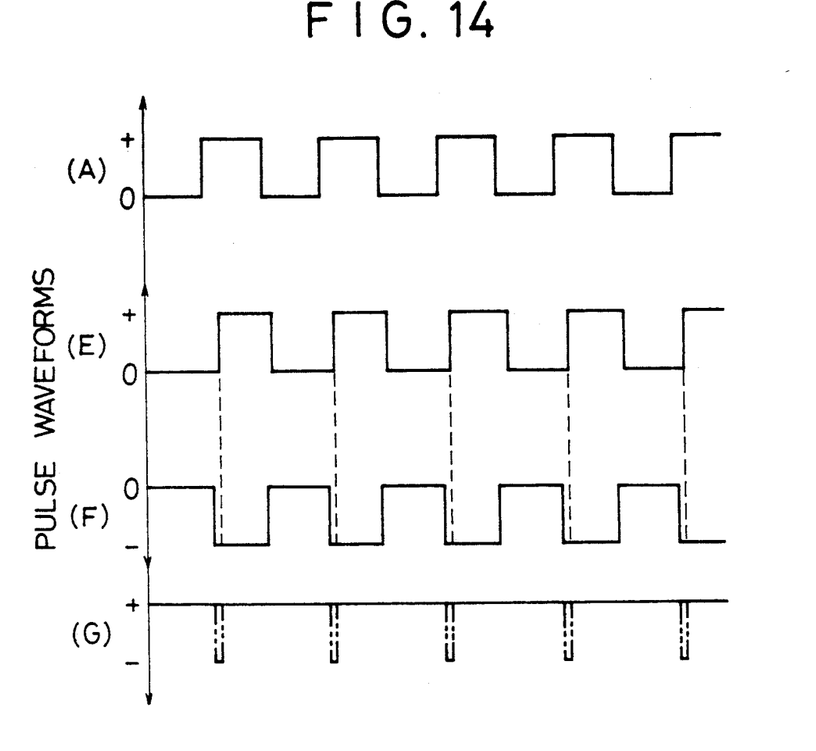
FIG. 14 is a diagram illustrating pulse waveforms at the individual points in the detector circuit of FIG. 9 when the first detecting pad is heated slightly higher than the predetermined temperature.
Figure 15:
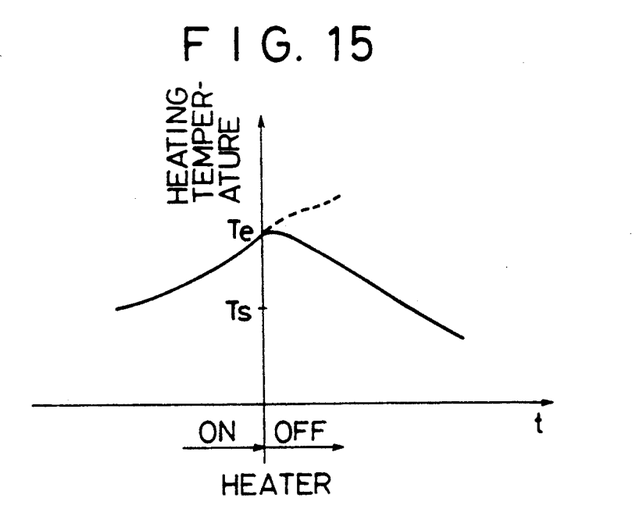
FIG. 15 is a graph showing temperature changes in the first detecting pad caused by turning ON/OFF of the heater.

Additionally, even if the first detecting pad 24 and the support 34 are, for instance, heated slightly above the preset temperature Te, causing the phase of the pulse waveform at point F to be advanced excessively in relation to the pulse waveform at point E in the detector circuit as illustrated in FIG. 14, no negative pulse waveform as shown by a 2-dash chain line will be generated at point G in the detector circuit. This means that at point G in the detector circuit G, the pulse waveform at point A is added to the pulse waveforms at points E and F, causing the positive pulse waveform from point A to offset the pulse waveform indicated by the foregoing 2-dash chain line. Hence, continued energizing of the heater 40 does not take place after the first detecting pad 24 and the support 34 are heated to the present temperature Te. Accordingly, as shown in FIG. 15, the first detecting pad 24 and the support 34 are not heated above the preset temperature Te as illustrated by the dotted line in FIG. 15 because energizing of the heater 40 is stopped as soon as the first detecting pad 24 and the support 34 reach the present temperature Te.

The present invention is not restricted to the foregoing embodiments, but is available in various other modifications.

The detecting device employs a method which utilizes the difference in heat transfer rate between gases and liquids to detect the level of a liquid in the receptacle; therefore, the liquid in the receptacle is not limited to foods such as beer and syrup. For instance, if the detecting device is attached to a high-pressure gas tank filled with LPG or other liquefied special gas, the detecting device enables detection of the level of the liquid in the gas tank.

Additionally, the receptacle to which the detecting device is applicable is not limited to a metallic one, but may also be one which is made of a heat-conducting, opaque synthetic resin.

Figure 16:
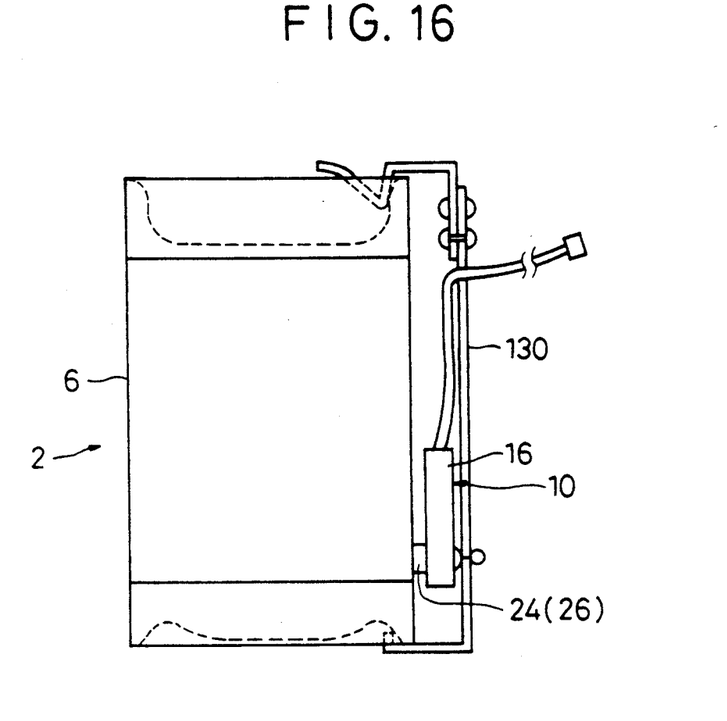
FIG. 16 is a side view of a mounting arm for the detecting device.
Figure 17:
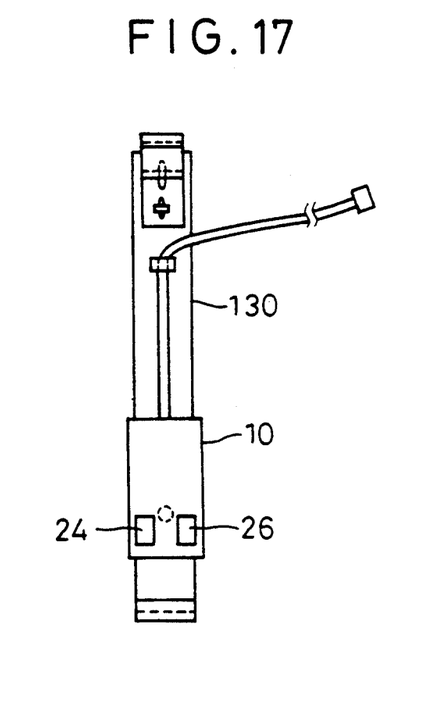
FIG. 17 is a rear view of the mounting arm of FIG. 16.

Further, the case 16 of the detecting device 10 can be mounted on the outer wall 6 of the receptacle 2 by means of a mounting arm 130 instead of the belt 8 as shown FIG. 16 and 17. The mounting arm 130 vertically extends along the outer wall 6 of the receptacle 2 and has upper and lower ends which can be engaged with the upper and lower edges of the receptacle 2. The detecting device 10 is mounted on the lower part of the rear surface of the mounting arm 130 and has a cable which extends from the case 16 and can be connected to the power supply.

What is claimed is:

1. A device for detecting the surface level of a liquid contained in a thermal-conducting receptacle made of an untransparent material, the device comprising:
    first and second heat conduction members to be in contact with an outer wall of the receptacle, said second heat conduction member being apart from said first heat conduction member in a horizontal direction;
    a first temperature sensor for detecting temperature changes in said first heat conduction member;
    a second temperature sensor for detecting the temperature of said second heat conduction member;
    heating means for electrically heating said first heat conduction member to a preset temperature which is higher than that of said second heat conduction member detected by said second temperature sensor when said first and second heat conduction members are in contact with the outer wall of the receptacle; and
    controlling means for controlling the heating of said first heat conduction member by said heating means in accordance with an output change of said first temperature sensor, which output change results from the changes of an amount of transmitted heat, corresponding to the liquid level in the receptacle, that is released from said first heat conduction member into the receptacle through the outer wall of the receptacle.

2. The device according to claim 1, wherein said first and second temperature sensors are thermistors.

3. The device according to claim 2, wherein said controlling means includes a circuit for controlling a quantity of electricity supplied to said heating means to maintain said first heat conduction member at the preset temperature in accordance with outputs of said first and second thermistors, the circuit having an output terminal which outputs the quantity of electricity supplied to said heating means.

4. The device according to claim 3, wherein the circuit includes a Zener diode which is connected in series to the first thermistor, and determines the quantity of electricity to be supplied to said heating means in accordance with changes in the resistance of the first thermistor.

5. The device according to claim 2, wherein said controlling means includes a circuit for stopping the supply of electricity to said heating means when a temperature of said first heat conduction member detected by said first thermistor raises at the preset temperature, and then restarting the energizing of said heating means when a temperature of said first heat conduction member detected by said first thermistor lowers at the temperature of said second heat conduction member detected by second thermistor, the circuit having an output terminal for sending energizing ON/OFF signals to said heating means.

6. The device according to claim 5, wherein the circuit includes a pulse generator circuit which supplies pulse signals to said first and second thermistors, and a switching circuit for sending energizing ON/OFF the signals to said heating means in accordance with a difference between phases of the pulse signals passed through said first and second thermistors.

7. The device according to claim 2, wherein the device further comprises a case equipped with said first and second heat conduction members, said heating means and said first thermistor being incorporated in said first heat conduction member, and said second thermistor being incorporated in said second heat conduction member.

8. The device according to claim 7, wherein the device further comprises mounting means for fixing the case on the outer wall of the receptacle in such a manner that the case can be removed.

9. The device according to claim 1, wherein said first and second heat conduction members have a surface to be in close contact along the outer wall of the receptacle.

* * * * *